May 25, 1954     N. O. CLARK     2,679,566

THERMAL-SENSITIVE DEVICE

Filed April 27, 1951

INVENTOR.
NELSON O. CLARK
BY
    ATTORNEY

Patented May 25, 1954

2,679,566

UNITED STATES PATENT OFFICE 2,679,566

THERMAL-SENSITIVE DEVICE

Nelson O. Clark, Winthrop, Mass.

Application April 27, 1951, Serial No. 223,422

6 Claims. (Cl. 200—137)

This invention relates broadly to thermal-sensitive devices and in particular to such devices which are intended to be unaffected by gradual temperature changes in the ambient temperature to which these devices are normally exposed, but to react quickly in response to relatively sudden changes in temperature.

The device of the present invention is not to be confused with well known thermostatic devices used for regulating temperature within certain limits, since it operates on an entirely different principle. Broadly speaking, the present invention contemplates the employment of a relatively massive, substantially inert body in combination with a highly sensitive, relatively lightweight body, and wherein the massive body is intended to respond slowly to any temperature changes, whereas the lightweight body is designed to respond quickly to unusual and sudden changes. Thus the device in toto will not be influenced by gradual changes of ambient temperature.

For the purpose of translating the above principle into a practical example, it is proposed to employ in combination with a relatively voluminous, substantially inert body, a relatively thin, thermalsensitive diaphragm or disc, which is slightly bowed and which is held under tension or compression stress in respect to that inert body, and from which body the diaphragm is electrically insulated. Within the body there is provided a contact which is rendered adjustable relative to said diaphragm and is adapted to be engaged by the latter. By the adjustment of the contact the rate of speed or the time required for effecting either the engagement of the contact by the diaphragm or the latter's disengagement from the contact is determined. It is preferred that both the massive body as well as the diaphragm are made of material having substantially equal or nearly equal coefficients of thermal expansion. In order to adapt the device for practical use as an electric control instrument, the contact of the body and the diaphragm or that portion thereof adapted to engage the contact are provided with independent conductors leading to the circuit to be controlled by the device.

Although it is preferred to construct the massive inert body and the diaphragm from metal, it is quite obvious that any other temperature-sensitive material may be substituted.

The principal object of the present invention is the provision of a thermal-sensitive device which will quickly react to sudden temperature changes, but which will not be influenced by gradual changes of the ambient temperature surrounding the device.

Another object of this invention is the provision of a relatively simple, highly-efficient and substantially inexpensive device of the type indicated, the rate of operation of which device may be readily controlled.

A more specific object of this invention is the provision of a thermal-sensitive device wherein is employed at least one relatively massive or voluminous, substantially inert body and a relatively lightweight, thin diaphragm exposed to quick reception of temperature changes in the ambient temperature to which the device is exposed, said diaphragm being highly sensitive, and being adapted to quickly react to such changes induced either by radiation or convection, and wherein the massive body employed is preferably protected against such quick changes in the ambient temperature and due to its relatively large volume possesses a greater heat-retaining capacity than said diaphragm and therefore is intended to lag behind in responding to sudden changes in the ambient temperature, such lag may be determined to be in definite proportion or rate in respect to the action of the diaphragm and which action or rate of action may be determined by adjustment means with which the device is equipped.

Still another specific object of this invention is the provision of a device for the purpose indicated, which consists of a relatively voluminous body in conjunction with a lightweight, relatively thin diaphragm rendered operative in respect to said body, and wherein the body is so constructed that it is adapted to receive a dielectric peripheral holder for that diaphragm so that the latter is kept under compression or tensional stress, and wherein means are provided for fixedly joining the holder, gripping the diaphragm, with said voluminous body, the latter being equipped with an adjustable contact which is intended for engagement by said diaphragm, and wherein independent electric conductors are connected with the diaphragm and said body and lead outward from the device to whatever instrumentality is to be regulated by the latter.

A still further object of this invention is the provision of the device as stated above, and wherein, for the purpose of increasing the sensitiveness of the diaphragm, a heating element is incorporated in the device which is adapted to raise the temperature of the diaphragm and thus placing the diaphragm under greater tension above that normally exerted by its holder.

Another object of this invention is the provision of a thermal-sensitive device, wherein is employed a relatively voluminous inert body in conjunction with a relatively thin, readily operative diaphragm movable relative to said body and which body is equipped with an adjustable contact adapted for either engagement by or disengagement from said diaphragm when relatively sudden temperature changes occur, and wherein that diaphragm is bowed outwardly in respect to the voluminous body and is held under tension by a dielectric holder lodged in the body, the diaphragm being adapted to normally engage said adjustable contact and being further adapted to disengage that contact when a sudden rise in temperature occurs.

Still another object of this invention is the provision of a device of the type indicated, employing a relatively voluminous body in conjunction with a thin bowed diaphragm, said body having an adjustable contact adapted to be engaged by the diaphragm, and wherein the diaphragm is bowed towards said body and is held under tension within a dielectric holder lodged in the body and is adapted to normally clear the contact in the body, but being further adapted to engage the contact in response to sudden temperature changes in the ambient temperature surrounding the device.

A still further object of this invention is the provision of a thermal-sensitive device wherein is employed at least one substantially voluminous inert body in conjunction with two diaphragms, one being bowed outwardly in respect to the body, the other being bowed toward the body, both diaphragms being held under tension and being dielectrically insulated from the body, and wherein the body is provided with two adjustable contacts adapted to be engaged by the two diaphragms, and wherein independent electric conductors lead from each one of the diaphragms and from the body to an instrument to be controlled by the action of the device, the device being adapted to serve as a double throw switch for either first breaking the circuit before making it, or for first closing the circuit before breaking it.

The foregoing and numerous other objects and important advantages of this invention will become more clearly evident as the description of the device progresses in conjunction with the accompanying drawings, disclosing several embodiments of the invention in the presently preferred form, but which illustrations are by no means intended to restrict the invention to the actual structures shown, and wherein.

Figure 1:
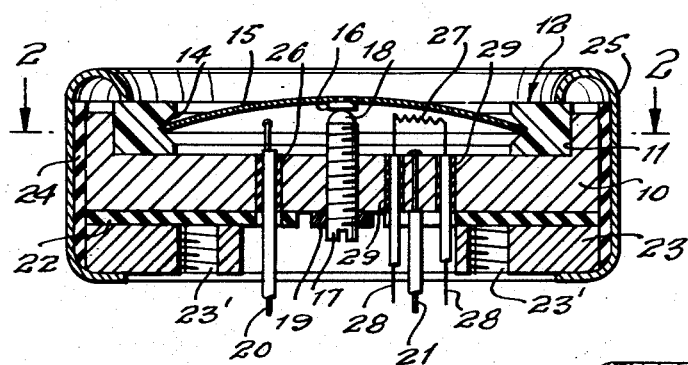
Fig. 1 is a vertical section through one form of the device.
Figure 2:
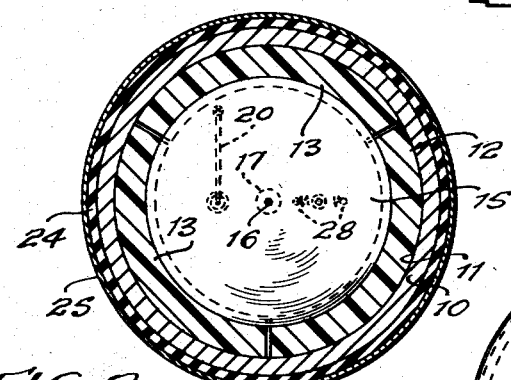
Fig. 2 is a section in reduced size taken along line 2—2 of Fig. 1.
Figure 3:
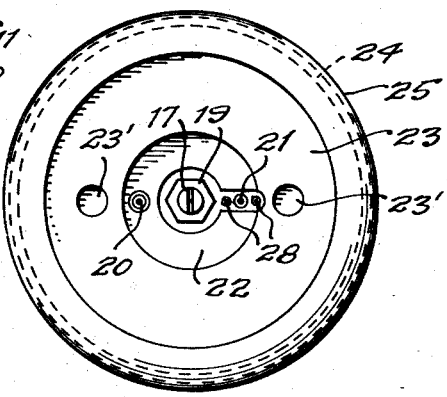
Fig. 3 is a bottom view, also in reduced size, of the device shown in Fig. 1.

The device shown in Figs. 1, 2 and 3 comprises a relatively massive or voluminous body 10, which is dished or recessed as at 11, to provide a seat for the reception of a dielectric clamping ring 12, preferably composed of three or more sections 13, clearly seen in Fig. 2, although a peripherally adjustable ring, such as a simple split ring will serve the purpose. Ring 12 has an internal, substantially V-shaped seating groove 14 in which is held under tension or compression a bowed, relatively thin diaphragm 15 which is substantially less massive or less voluminous than body 10. It is preferred that a contact point, such as contact 16, be secured at or near the apex of diaphragm 15, although its use is not absolutely essential. Ring 12 is adapted to hold diaphragm 15 under tension or compression stress and, being peripherally adjustable, facilitates its being forcibly seated in recess 11 of body 10, and thus exert pressure peripherally toward the apex of the diaphragm. Passing through body 10 is an adjusting screw 17, preferably equipped with a contact 18 for engagement by contact 16 of the diaphragm. A lock nut 19 for the adjustable contact screw 17 is illustrated but is not absolutely essential. Connected with the diaphragm is an electric conductor 20 and another conductor 21 extends from body 10. An insulating disc 22 is placed against the bottom of body 10 and adjacent disc 22 there is a mounting plate 23, preferably of rigid metal, said plate having mounting holes 23'. Exteriorly to body 10, as well as to insulating disc 22 and mounting plate 23, there is provided an insulation sleeve 24. Engaging the seating ring in the recess 11 of body 10 and firmly connecting the ring, the body, insulating disc 22 and mounting plate 23, and holding all of these elements in fixed relation to one another is an outer metal casing or housing 25. It will be noted that lead 20 from diaphragm 15 passes through an insulation tubing 26.

As an optional feature intended for the device there will be seen a resistance heater 27, the independent leads 28 of which pass through insulating cylinders 29 seated in body 10. Heating element 27, when energized, is adapted to heat diaphragm 15, thereby increasing the tension at which the diaphragm is normally held by ring 12, thus augmenting the sensitiveness of the diaphragm and shortening the time of its reaction to sudden temperature changes.

A modified form of the above-described device is illustrated in Fig. 4 wherein again a relatively voluminous body 10 is illustrated, which holds in its recessed seat 11 peripherally adjustable clamping ring 12, the latter being again provided with a V-shaped groove 14 in which is tensionally held diaphragm 15', bowed inwardly, that is toward body 10. The diaphragm is shown equipped with a contact 16' opposite an adjustable contact screw 17', having a contact 18'. Engaging the screw is an adjusting nut 19'. An electric conductor 20' extends from diaphragm 15' through body 10, and lead 21' serves for connection from the body. Insulating disc 22, mounting plate 23 equipped with mounting holes 23', insulating sleeve 24 and housing 25 holding all the elements of the device in fixed relation to each other are again employed, the same as in Fig. 1. Contact 16' of diaphragm 15' are adapted in this second embodiment to be normally spaced from adjustable contact screw 17'.

Figure 4:
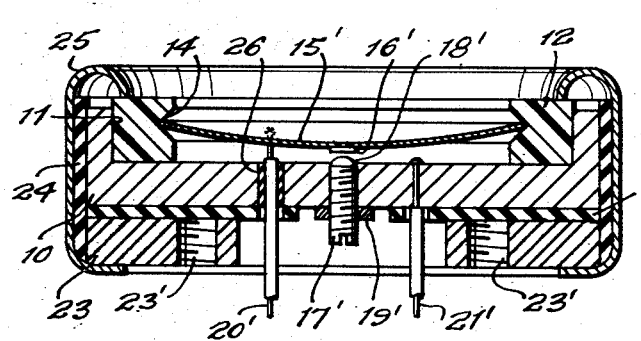
Fig. 4 is a vertical section through a modified form of the device similar to that shown in Fig. 1.

In the modification illustrated in Fig. 5 there is again employed a substantially inert, voluminous body 30, provided with oppositely disposed seating recesses 31 and 32, in which are lodged clamping rings 33 and 34 for outwardly and inwardly bowed diaphragms 35 and 36, respectively. In the body 30 there are mounted adjustable contact screws 37 and 38 adapted for engagement by their respective diaphragms. These diaphragms are preferably equipped with contacts 35' and 36', and in each of the diaphragms there are apertures 39 and 40 for facilitating the adjustments of screws 38 and 37 having end contacts. Extending from diaphragm 35 is an insulated lead 41 and another such lead 42 electrically connects diaphragm 36. A third lead 43 passes from body 30 through an insulating bead 44 of diaphragm 36. It will be noted that in this modification the mounting plate and the insulating disc employed in Figs. 1 and 4 are omitted. Insulating housing 45 securely holds rings 33 and 34 against body 30. Diaphragm 35 with its contact 35' is adapted to normally engage adjusting screw 37, whereas diaphragm 36 with its contact 36' remains normally distanced from adjustable contact 38. This device is capable of employment as a double-throw switch to either first break and then close a circuit, or first close a circuit and then break it.

Figure 5:
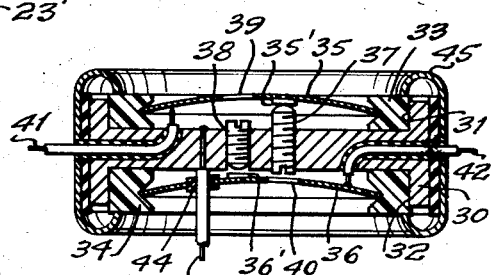
Fig. 5 is a vertical section through still another modification of the device for use as a switch with a double throw action.

All of the forms of the present device shown in Figs. 1, 4 and 5 are intended to serve for explanatory purposes only and their construction is by no means to be considered as limiting this invention to the specific designs illustrated, since the organization and arrangement of the device is subject to changes arising from the possibility of employing the device as a control for a great number of different instrumentalities adapted to serve a large variety of purposes.

Application

When used as a fire-detecting control, the device may be held in its simplest form such as shown in Figs. 1 and 4. Similarly devices of such construction may be used as controls to prevent overriding of heating systems due to sudden changes in outdoor temperature, or for the protection of industrial furnaces and similar equipment which may be damaged by sudden changes in temperature. Either of the devices shown in Figs. 1 and 4 or the modified form illustrated in Fig. 5 may be employed as a control for heat treating equipment, or as a sentinel during the cooling period after heat treatment. The above are only a few examples of possible employment to indicate the versatility of the present device, which may be obviously used as a control for any instrumentality or any system where it is essential to prevent either over-function, or under-function of such a system and to anticipate or prevent them, when a temporary or sudden, temperature change occurs.

Basic function

It is assumed that the device is exposed to normal ambient temperature. When, due to sudden or temporary conditions, changes in temperature take place, such rapid changes in temperature will not affect the rather voluminous body of the device, such as bodies 10 and 30, but will immediately cause the operation of diaphragms 15, 15', 35 and 36, which, due to their being held constantly under stress or tension, become extremely sensitive, and will immediately react to such sudden temperature changes.

In the embodiment shown in Fig. 1, diaphragm 15, when exposed to a rapid increase in temperature, will expand and will disengage adjustable contact 17. In the form shown in Fig. 4 diaphragm 15' will also expand in response to such sudden temperature changes and will move to engage contact 17'.

In the modification shown in Fig. 5 diaphragm 35, when exposed to a sudden rise of heat, will disengage contact 37 while diaphragm 36 will move into engagement with contact 38.

One of the noteworthy features of the present device resides in the fact that the massive or voluminous inert bodies in all modifications illustrated are covered to shield them more or less against direct exposure to sudden temperature changes whereas the diaphragms are fully exposed. In Figs. 1 and 4 seating ring 12, housing 25, insulating sleeve 24, mounting plate 23 and insulating disc 22 fulfill together with diaphragms 15 and 15' the function of shielding body 10; in the form shown in Fig. 5 the shielding function is effected by rings 33, 34, insulated housing 45 and the two diaphragms 35 and 36.

When changes in the ambient temperature are gradual over a relatively long period of time, the entire device will so-to-speak accommodate itself to such changes, and the diaphragms will not operate in respect to their contacts. Thus only when sudden temporary changes in temperature take place, action by the diaphragms is intended. The quickness or rate of such actions of either closing or opening circuits may be readily determined by the adjustment of the contact screws employed in the voluminous bodies of the devices. Thus in any one of the embodiments the breaking or closing action may be quickened or slowed down depending upon the particular requirement and use of the devices.

The three modifications illustrated are designed to react to upward changes in temperature. Obviously they may be adapted for downward fluctuation in temperature by suitably shaping the diaphragms to respond to sudden lowering of the ambient temperature to which the devices are exposed. Such changes in the construction of the diaphragms being self-evident, specific illustrations of devices responsive to downward fluctuations in the ambient temperature have been omitted.

Therefore, while the preceding description explains the construction of the specific illustrations, changes, variations and modifications of the devices and its parts may be effected to adapt the devices for different purposes, such adaptation being deemed to reside within the broad, basic scope of the present invention as defined in the annexed claims.

What is claimed as new is:

1. In a thermal-sensitive device, the combination with a relatively massive, dished, completely shielded metal body, of an exposed thermal-sensitive relatively thin diaphragm, adapted to cooperate with said body and operatively mounted within the dished portion thereof and being readily responsive to sudden temperature changes, and insulation material intimately associated with and substantially completely covering all outer surfaces of said body except those adjacent said diaphragm.

2. In a thermal-sensitive device according to claim 1, and wherein said body forms an annulus, and wherein said body and said diaphragm are made of a material having a substantially equal coefficient of thermal expansion, and wherein a part of said insulation material forms a ring within the dished portion of the body, and wherein said diaphragm is mounted within said ring.

3. In a thermal-sensitive device according to claim 2, and wherein said ring has an annular recess at its interior periphery for accommodating said diaphragm and for holding the latter under compression.

4. In a thermal-sensitive device according to claim 3, and wherein fixed contact means are provided with said diaphragm and adjustable contact means are provided within said body, the latter contact means being adapted to cooperate with and being movable relative to said fixed contact means.

5. In a thermal-sensitive device according to claim 4, and wherein a casing is provided to enclose said massive body and to engage said diaphragm-holding ring so that said adjustable contact means are rendered accessible.

6. In a thermal-sensitive switch device, the combination with a relatively massive shielded metal body, of relatively thin exposed metal diaphragm highly sensitive and readily responsive to sudden changes in ambient temperature to which latter the device is normally exposed, said diaphragm being operative in respect to said body, adjustable contact means extending from the body, said diaphragm being adapted for cooperation with said contact means; the adjustment of said contact means in respect to said diaphragm determining the speed of cooperation of the latter with said contact means, said body being provided with a seat, a peripherally adjustable clamping ring for peripherally engaging and compressing the diaphragm held in said seat, said diaphragm and said body being insulated from one another, and a housing for and insulated from said diaphragm and said body for holding these two elements in fixed relation to one another.

References Cited in the file of this patent

UNITED STATES PATENTS

| Number | Name | Date |
|---|---|---|
| 308,120 | Wilder et al. | Nov. 18, 1884 |
| 562,353 | Brazelton et al. | June 16, 1896 |
| 2,203,558 | Wilson | June 4, 1940 |
| 2,313,083 | Malone | Mar. 9, 1943 |
| 2,332,212 | Fillo | Oct. 19, 1943 |
| 2,384,153 | Bower | Sept. 4, 1945 |